Figure 1A:
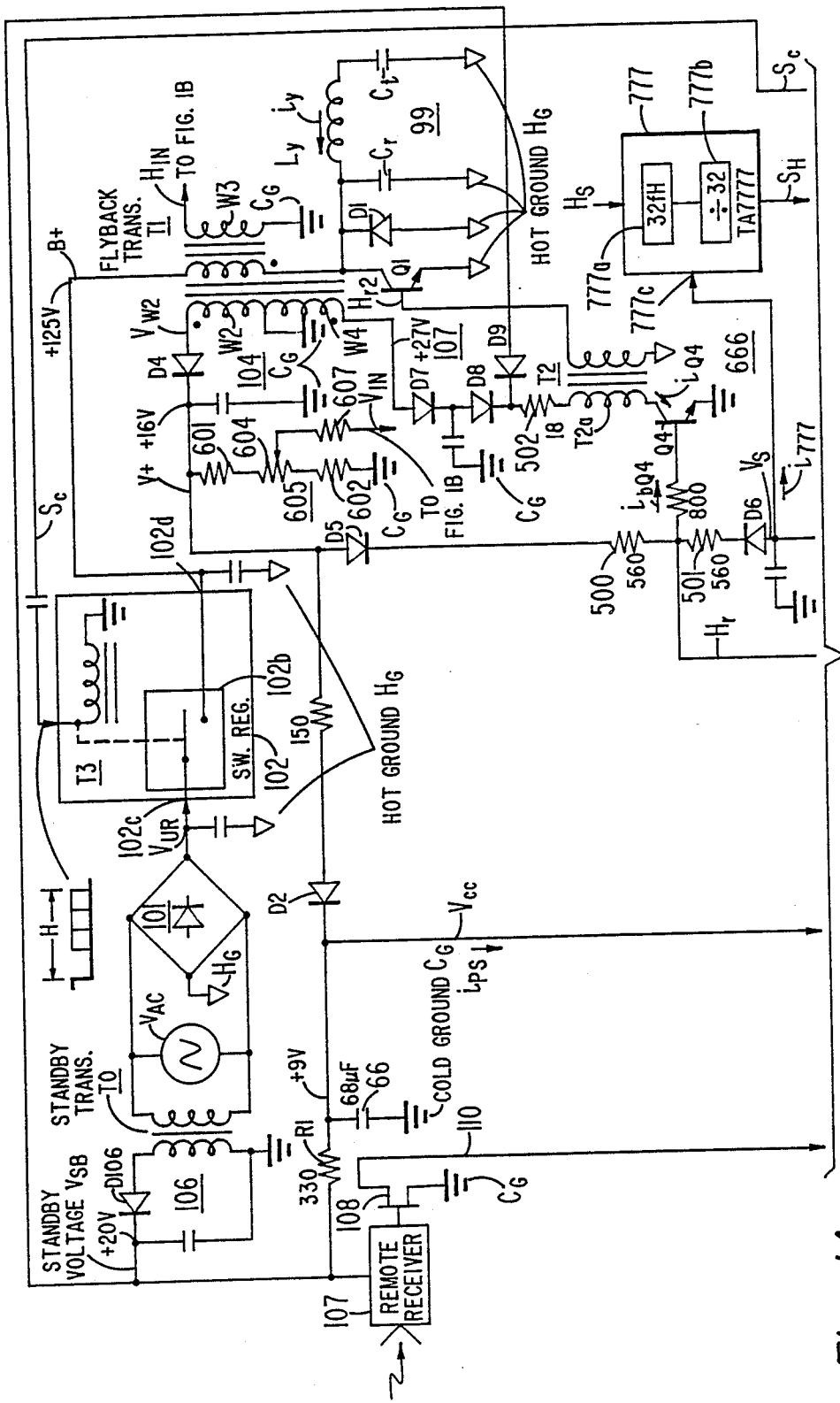

United States Patent [19]

Lendaro et al.

[11] Patent Number: 4,734,771
[45] Date of Patent: Mar. 29, 1988

[54] START-UP CONTROL CIRCUITRY FOR A TELEVISION APPARATUS

[75] Inventors: Jeffery B. Lendaro, Noblesville; Robert L. Shanley, II, Indianapolis, both of Ind.; Jack Craft, Bridgewater; Michael L. Low, Old Bridge, both of N.J.

[73] Assignee: RCA Corporation, Princeton, N.J.

[21] Appl. No.: 42,078

[22] Filed: Apr. 24, 1987

[51] Int. Cl.$^4$ .............................................. H04N 5/63
[52] U.S. Cl. .................................. 358/190; 315/411; 358/243; 363/56
[58] Field of Search .......................... 358/190, 243, 74; 363/56, 21, 20; 315/411, 380

[56] References Cited

U.S. PATENT DOCUMENTS

| | | | |
|---|---|---|---|
| 4,127,875 | 11/1978 | Fernsler et al. | 358/190 |
| 4,188,641 | 2/1980 | Baker et al. | 358/190 |
| 4,240,013 | 12/1980 | Wedam | 358/190 X |
| 4,301,394 | 11/1981 | Dietz | 315/411 X |
| 4,377,775 | 3/1983 | Willis | 315/411 |
| 4,385,264 | 5/1983 | Balaban et al. | 358/190 X |
| 4,429,259 | 1/1984 | Luz | 358/190 X |
| 4,481,564 | 11/1984 | Balaban | 363/21 |
| 4,500,923 | 2/1985 | Duvall et al. | 358/190 |
| 4,516,168 | 5/1985 | Hicks | 358/190 |
| 4,532,457 | 7/1985 | Harferl | 358/190 X |
| 4,595,977 | 6/1986 | von der Ohe | 363/21 X |
| 4,651,214 | 3/1987 | Rodriguez-Cavazos | 358/190 |
| 4,692,852 | 9/1987 | Hoover | 363/21 |

OTHER PUBLICATIONS

A data sheet for linear integrated circuits CA3210E and CA3223E of the RCA Corporation published May 1982, entitled, TV Horizontal/Vertical Countdown Digital Sync System.
Two technical publications dated 1986 that were published by RCA Corporation, Consumer Electronics, Indianapolis, Indiana, that are related to RCA television chassis CTC 120.

Primary Examiner—Howard W. Britton
Assistant Examiner—E. Anne Faris
Attorney, Agent, or Firm—Eugene M. Whitacre; Joseph J. Laks; Sammy S. Henig

[57] ABSTRACT

A supply voltage is developed in accordance with an on/off control signal of a remote receiver during a start-up interval and during a power-up mode of operation of a television power supply. During a standby mode of operation, the supply voltage is switched off. The supply voltage produces a supply current in an oscillator that produces a signal at a horizontal rate related frequency. The supply voltage also produces a base drive current in a switching transistor of a horizontal driver only during the start-up interval. During a power-up mode, a run supply voltage is coupled to the oscillator and to the driver.

19 Claims, 3 Drawing Figures

TO FIGURE 1B

START-UP CONTROL CIRCUITRY FOR A TELEVISION APPARATUS

The invention relates to an arrangement for starting up the operation of a power supply in a television circuit.

In, for example, a television receiver, a pulse-width modulator, or voltage regulator that generates a pulse-width modulated control signal, at a horizontal related frequency, for controlling a run power supply may be included in an integrated circuit (IC) that is referred to herein as the deflection IC supplies a run mode supply voltage such as a regulated B+ supply voltage for energizing a horizontal output stage during a run, or power-up mode. The horizontal drive circuitry generates a horizontal drive signal. The horizontal drive signal may be coupled through a horizontal driver to form a high power drive signal that controls the timings in a horizontal output stage. The deflection IC may be required to operate selectively in the power-up mode and in a standby mode, in accordance with an on/off control signal, provided by, for example, a remote receiver.

The voltage regulator may be required to supply the pulse-width modulated control signal for controlling the run power supply, in the power-up mode. When operation in a standby mode is required, such control signal may be required to prevent the power supply from energizing the deflection circuitry until, for example, such time when a user initiates a power-up command via the remote receiver that causes a start-up interval that follows the standby mode to begin. The pulse-width modulator of the deflection IC may be required to be energized during the power-up mode but may not need to be energized during the standby mode.

The remote receiver, for example, may be energized during both the power-up mode and the standby mode by a separate standby power supply. The standby power supply may include a standby transformer having a primary winding that is coupled to an AC, mains supply source. A voltage that is developed at a secondary winding of the transformer may be rectified to produce a DC, remote standby energizing voltage.

Each of the standby energizing voltage and the run mode supply voltage of the run power supply may be selectively applied during the standby mode and the power-up mode, respectively, to a supply voltage receiving terminal of the deflection IC to form an energizing voltage at such terminal that energizes the deflection IC. The standby energizing voltage energizes, via such terminal, those portions of the deflection IC that are required to be energized during the standby mode and during at least a portion of the start-up interval that follows; whereas, during the power-up mode that follows the start-up interval, the run-mode power supply provides the entire or principal energizing voltage to the terminal.

It may be desirable to reduce the supply current that is required from the standby transformer so as to reduce the cost of such transformer. To this end, the standby energizing voltage is coupled through a relatively large resistance to a storage capacitor to charge the storage capacitor during the standby mode. A voltage that is proportional to the charge already stored in the storage capacitor is coupled to the supply voltage receiving terminal of the deflection IC to provide the energizing voltage at the terminal of the deflection IC during the start-up interval and the standby mode. Because of such relatively large resistance, the current drain from the standby transformer during the start-up interval is, advantageously, reduced.

The horizontal drive circuitry that generates the horizontal drive signal to the horizontal output stage may include a horizontal oscillator that is synchronized to a horizontal sync signal derived from a baseband television signal. An output signal of the horizontal oscillator may also be used by, for example, the pulse-width modulator of the deflection IC to provide the control signal that is pulse-width modulated at a frequency that is related to that of the oscillator output signal. During the start-up interval, the oscillator may be required to operate so as to provide its output signal to both the horizontal drive circuitry and the voltage regulator. Consequently, the oscillator may be required to operate during the start-up interval and during the power-up mode.

In a circuit embodying an aspect of the invention, a supply current and voltage receiving terminal of the oscillator is coupled to the capacitor that provides the energizing supply current and voltage to both the deflection IC and to the oscillator. The deflection IC includes a switching arrangement that shuts down, during the standby mode, at least a portion of the deflection IC to reduce the energizing current. Shut down also occurs, during the start-up interval, if the energizing voltage in the capacitor falls, due to discharging of the capacitor, below a minimum first predetermined level that is required for the start-up operation. Such shut-down allows the recharging of the capacitor again above a second predetermined voltage level that is higher than the first predetermined level.

In accordance with an aspect of the invention, the switching arrangement that shuts down the portion of the deflection IC, during the start-up interval and the standby mode, also switches off the supply voltage at the supply voltage receiving terminal of the oscillator. Thus, when the shut-down occurs, the oscillator is prevented from being energized that reduces the current drawn by the oscillator from the capacitor.

In accordance with another aspect of the invention, regulation of the supply voltage to the oscillator is obtained from a temperature compensated voltage regulator that is also used for regulating the voltage at the supply voltage receiving terminal of the deflection IC. Therefore, when, for example, the oscillator located outside the deflection IC, obtaining the supply voltage to the oscillator may, advantageously, require only one additional dedicated terminal of the deflection IC.

A horizontal driver, in a cold television chassis arrangement that is conductively isolated from the mains supply source, may include a driver transformer that provides the required hot-cold isolation barrier between the horizontal output stage that is conductively coupled to hot ground and between a horizontal rate switching signal that controls the horizontal driver transistor. In such arrangement, a primary winding of the driver transformer coupled to a collector electrode of a driver transistor may be required to be energized by a supply voltage that is conductively isolated from the mains supply voltage and from the hot ground. It may be desirable to utilize a hot-cold barrier formed by the standby transformer to provide the supply voltage that is conductively isolated from hot ground to the collector electrode the horizontal driver transistor during the start-up interval.

For reasons similar to those mentioned before, it may be desirable to reduce the current consumption in the horizontal driver transistor that is supplied during standby. Similarly, it may be desirable to reduce the current consumption in the horizontal driver transistor during the start-up interval, when, for example, the energizing voltage in the capacitor that was mentioned before falls below the first predetermined level.

In accordance with a further aspect of the invention, a supply voltage that is controlled by the on/off control signal controls the collector current in the driver transistor. When, as described before, shut-down occurs during the start-up interval and also during operation in the standby mode, the collector current of the driver transistor is, advantageously, reduced to zero. In this way, the current requirement from the standby transformer is, advantageously, reduced.

In accordance with yet further aspect of the invention, a television apparatus power supply includes a source of an input supply voltage. A transformer having a first winding is coupled to the input supply voltage. A first supply voltage is generated at a first terminal during operation in a standby mode and during operation in a start-up interval. A source of an on/off control signal is selectively indicative when operation in the standby mode is required and when operation in a power-up mode is required. A control circuit responsive to the on/off control signal generates a signal at a first frequency. The control circuit is energized during the start-up interval from a voltage that is derived from the first supply voltage. A first switching transistor responsive to the signal at the first frequency and to the on/off control signal has a main current conducting electrode that is periodically switched at a rate that is determined by the signal at the first frequency during operation in each of the power-up mode and the start-up interval. A second supply voltage is generated during the start-up interval but not in the standby mode. A second switching transistor has a main current conducting electrode that is coupled to the first supply voltage during both the start-up interval and the standby mode and a control electrode that is coupled to the second supply voltage. The control electrode of the second switching transistor is responsive to the switching of the main current conducting electrode of the first switching transistor for causing the second switching transistor to be conductive during the start-up interval. An output stage of the power supply is coupled to the main current conducting electrode of the second switching transistor for generating during the power-up mode a third supply voltage that is coupled to the main current conducting electrode of the second switching transistor.

Figure 1B:
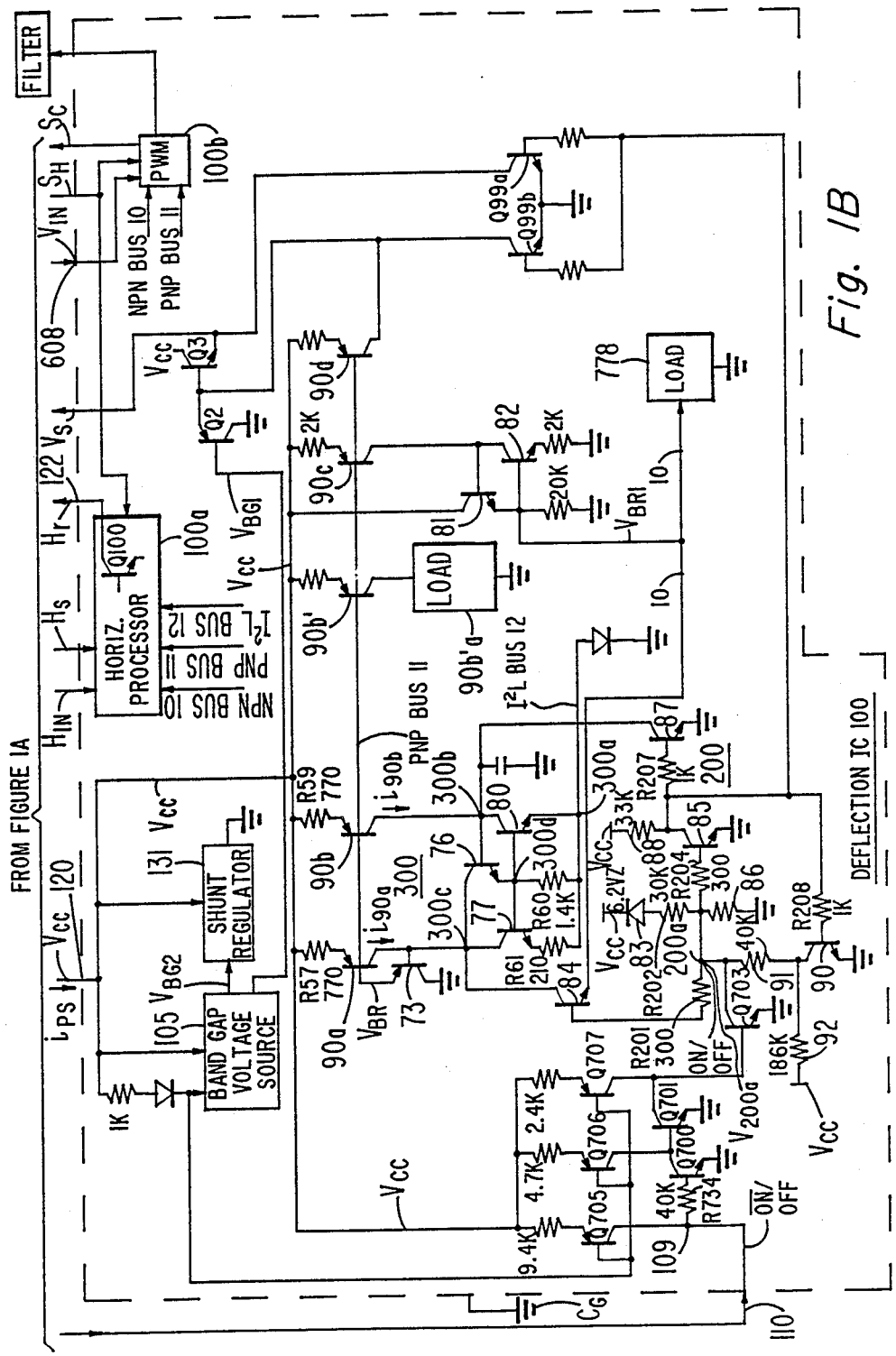

FIG. 1 that includes portions 1A and 1B illustrates a television power supply and start-up arrangement, embodying the invention; and FIGS. 2a–2d illustrate waveform useful for explaining operation in the start-up interval of the power supply of FIG. 1.

FIG. 1 illustrates a portion of a television receiver incorporating a deflection IC 100, embodying an aspect of the invention. Such portion of the television receiver includes a bridge rectifier 101 that rectifies a mains supply voltage $V_{AC}$ to produce a DC, unregulated voltage $V_{UR}$. A conventionally designed power supply output stage or switch regulator 102, that may include a silicon controlled rectifier (SCR) produces during a normal operation power-up mode a regulated voltage B+ that is coupled to a flyback transformer T1. An input supply terminal 102c of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. Output stage 99 is referenced to hot ground conductor $H_G$, depicted as a triangle that is solidly darkened. Hot ground $H_G$ is conductively coupled to voltage $V_{AC}$. A control signal $H_r$, that is a low power signal at the horizontal rate $f_H$ and that is produced in a corresponding portion of deflection IC 100 referred to herein as a horizontal processor 100a, is coupled via a horizontal driver 666 to the base electrode of transistor Q1. Driver 666 includes a transformer T2 that provides a cold-hot barrier between signal $H_r$, that is referenced to a cold ground conductor $C_G$, and a signal $H_{r2}$ that drives transistor Q1 and that is referenced to the hot ground conductor $H_G$. Signal $H_r$ controls the switching of transistor Q1 that generates a deflection current $i_y$ in a deflection winding $L_Y$ of output stage 99. Consequently, a retrace voltage $V_{w2}$ is produced across a winding W2 of transformer T1 in each retrace interval of each horizontal period H. A second retrace voltage $H_{in}$ developed in a winding W3 of transformer T1 that is coupled to horizontal processor 100a synchronizes deflection current $i_y$ to a synchronizing signal $H_s$. Signal $H_s$ is generated in a sync separator, not shown in the FIGURES.

A DC, run supply voltage V+ that is referenced to the cold ground conductor is produced by rectifying voltage $V_{w2}$ in a rectifier arrangement 104 that is coupled to winding W2. Voltage V+ is coupled to a corresponding portion of deflection IC 100 that is referred to herein as pulse width modulator, or switch mode regulator and driver 100b to provide a feedback signal $V_{IN}$. Regulator and driver 100b generates a pulse width modulated signal $S_c$ that controls the duration, in each horizontal interval H, in which switch regulator 102 is conductive. Signal $S_c$ is conductively isolated from hot ground conductor $H_G$ as a result of the isolation that is provided by a transformer T3 of switch regulator 102. The duty cycle of signal $S_c$ varies, in accordance with a difference between feedback signal $V_{IN}$ that is proportional to voltage V+ and a reference voltage $V_{NIN}$ that may be produced in a conventional manner, not shown in the FIGURES. Signal $S_c$ causes regulated voltage B+ to be at a predetermined DC voltage level such as, illustratively, +125 volts. Signal $S_c$, voltage B+ and voltage V+ are produced, illustratively, when deflection IC 100 operates in a power-up mode but not during a standby mode of operation.

Signal $H_r$ is formed at a terminal 122 using an uncommitted or open collector transistor Q100 of processor 100a. During the power-up mode, a base drive to a transistor Q4 of horizontal driver 666 that occurs during approximately one-half of each period H is provided from run voltage V+. Voltage V+ is coupled through a diode D5 in series with a resistor 500 to the base electrode of transistor Q4. During the rest of period H, the impedance at a terminal 122 that is formed by signal $H_r$ of IC 100 is low that causes transistor Q4 to be nonconductive.

The collector of transistor Q4 is coupled via a series arrangement of a primary winding T2a of a horizontal driver transformer T2, a resistor 502 and a diode D8 to a rectifier arrangement 107 that is similar to arrangement 104 and that is coupled to a winding W4 of flyback transformer T1. Arrangement 107 provides a run voltage to transistor Q4 during the power-up mode that is referenced to cold ground conductor $C_G$.

A standby transformer T0 steps down voltage $V_{AC}$. The stepped down voltage is rectified in a rectifier arrangement 106 to produce a standby voltage $V_{SB}$. Standby voltage $V_{SB}$, that is conductively isolated by transformer T0 from voltage $V_{AC}$ is coupled to an energizing voltage receiving terminal 120 of deflection IC 100 through a relatively large resistor R1.

During, for example, the standby mode, resistor R1 charges capacitor 66 from voltage $V_{SB}$ to produce, in capacitor 66, an energizing voltage $V_{cc}$. Regulated voltage V+ is coupled to terminal 120 via a diode D2, operating as a switch, to supply voltage $V_{cc}$ at terminal 120 from voltage V+ when deflection IC 100 operates in the power-up mode, but not when it operates at the standby mode.

Standby voltage $V_{SB}$ is coupled to a remote receiver 107 to provide the operating voltage of remote receiver 107. Remote receiver 107 is coupled via an MOS transistor 108 to IC 100. When transistor 108 is conductive, a low impedance is formed between a junction terminal 109 of a resistor R734 and ground conductor $C_G$. The low impedance occurs after, for example, a user initiates a power-on command via an infra-red communication link that causes a start-up interval to occur, as described later on. In the power-up mode that follows the start-up interval, the television receiver is fully operative. Conversely, after a power-off command is initiated by the user, transistor 108 becomes nonconductive and forms a high impedance circuit at terminal 109 that causes a standby mode to occur. In the standby mode the raster scanning on a display device of the television receiver is turned-off.

A transistor Q705, operating as a constant current source, has its collector coupled to junction terminal 109 between transistor 108 and resistor R734. As a result of the operation of transistors Q705 and 108, a start-up, or on/off signal 110 is developed. Signal 110 is at a high level, or a second state, when transistor 108 is noncoductive, that corresponds to operation in the standby off-mode, and at a low level, or a first state, when it is conductive, that corresponds with operation in the power-up on-mode.

Voltage $V_{cc}$ is regulated in deflection IC 100 by a shunt regulator 131 that may be required to regulate voltage $V_{cc}$ during operation in the standby mode and in the power-up mode. Regulation of voltage $V_{cc}$ during the standby mode may be desirable for protecting deflection IC 100 from an over voltage condition at terminal 120 that may occur should voltage $V_{cc}$ exceed the voltage rating of deflection IC 100. If permitted to occur, such over voltage condition may damage deflection IC 100. Also regulation of voltage $V_{cc}$ during the standby mode may be desirable for supplying regulated voltage $V_{cc}$ for operating circuitry in deflection IC 100 that are required to operate during the standby mode such as, for example, transistor Q705. Shunt regulator 131 regulates voltage $V_{cc}$ in accordance with a reference voltage $V_{BG2}$ that is generated during both the power-up and standby modes. Voltage $V_{BG2}$ is generated in, for example, a bandgap type voltage source 105 that is, therefore, required to operate during both the standby and the power-up modes.

A circuit portion of deflection IC 100 that does not have to be energized during the standby mode, may include a first plurality of transistors. Such arrangement is depicted by, for example, transistors 90a–90d and 90b' of the P-N-P type. Each of such transistors may be arranged in a common base configuration to form, at the collector of the corresponding transistor, a current source. Each of transistors 90a–90d and 90b' has its base electrode coupled to a common conductor, or rail line, that is referred to as PNP bus 11.

The collector current in each of transistors 90a–90d and 90b' is controlled by a voltage $V_{BR}$ that is coupled, via PNP bus 11, to the corresponding base electrode of each of transistors 90a–90d and 90b' and that is generated by a temperature compensated current control arrangement 300. The emitter electrodes of the abovementioned transistors 90a–90d and 90b' are coupled through corresponding resistors to supply voltage $V_{cc}$ that is, as described before, a fixed DC voltage. Transistor 90b' and a load 90b'a represent a plurality of transistors, each having an emitter that is coupled to voltage $V_{cc}$, a base that is coupled to voltage $V_{BR}$ and a collector that is coupled to a corresponding load.

Current control arrangement 300 includes transistors 90a, 90b, 73, 76, 77 and 80. The collector of transistor 73 is grounded. The collector of transistor 90a is coupled to the base of transistor 73 and, at a terminal 300c, to the collectors of transistors 76 and 77. The emitter of transistor 77 is coupled to a terminal 300a via a resistor R61. The emitter of transistor 76 is coupled to the base of transistor 77, to the base of transistor 80 and, via a resistor R60, to terminal 300a. Transistor 80 is arranged in a common emitter configuration. The base of transistor 76 is coupled, at a terminal 300b, to the collectors of both transistor 80 and 90b. The emitter of transistor 80 is coupled to terminal 300a. Such arrangement causes the voltage drop across resistor R60 to be equal to the base-emitter voltage of transistor 80. Transistors 76, 77 and 80 form a temperature compensating feedback network that controls voltage $V_{BR}$. Transistor 76 forms, with transistor 80, a feedback arrangement that causes a collector current $i_{90\,b}$ of transistor 90b to flow also as a collector current in transistor 80, by developing the corresponding base-emitter voltage in transistor 80 and across resistor R60.

An example of an arrangement that provides temperature compensation similar to current control arrangement 300 is described in detail in U.S. Pat. No. 3,886,435, in the name of S. A. Steckler, entitled VBE VOLTAGE SOURCE TEMPERATURE COMPENSATION NETWORK that is incorporated by reference herein.

Each of horizontal processor 100a and regulator and driver 100b that produce signals $H_r$ and $S_c$, respectively, is controlled by voltage $V_{BR}$ in a conventional manner, not shown in the FIGURES. An example of a manner by which, during normal operation, a voltage such as voltage $V_{BR}$ that controls transistors such as transistors 90a–90d may generate control signals such as, for example, signals $S_c$ and $H_r$ is depicted in a data sheet for a linear integrated circuit CA3210E and CA3223E of the RCA Corporation, published May, 1982, and entitled TV Horizontal/Vertical Countdown Digital Sync System.

When the collector currents in each of transistors 90a–90d is zero, signal $S_c$, for example, is in an inactive state. The result is that, during the standby mode, a pass switch 102b of regulator 102 remains nonconductive. Consequently, voltage B+ is not generated and transistor Q1 of output stage 99 remains unenergized.

On/off signal 110 is coupled via an arrangement, operating as a signal inverter, that includes transistors Q700, Q701 and Q703, to a junction terminal 200a of an on/off switching arrangement 200. During operation in the power-up mode, a second on/off control signal $V_{200a}$ that is developed at junction terminal 200a is at a high level as a result of signal 110 being at the low level; conversely, during operation in the standby mode signal $V_{200a}$ is at a low level.

On/off switching arrangement 200 includes a zener diode 83 that has its cathode coupled to voltage $V_{cc}$ and its anode coupled via a resistor R202 to junction terminal 200a that is coupled to the bases of two switching transistors 84 and 85. Junction terminal 200a is coupled via a resistor 86 to ground.

The emitter of switching transistor 84, that is conductive only during the start-up interval, following a user initiated power-up command, is coupled to a conductor 10 at a junction between the base of a transistor 82 and the emitter of a transistor 81. Conductor 10 is coupled to a load 778 that provides a current path to an emitter current in transistor 84 when transistor 84 is conductive. The collector of transistor 84 is coupled back to both collectors of transistors 76 and 77 of current control arrangement 300 at terminal 300c.

The collector of transistor 85, operating as a switch, is coupled to the bases of transistors 87 and 90 and to voltage $V_{cc}$ via a resistor 88 to turn-on transistors 87 and 90 when transistor 85 is nonconductive. The collector of transistor 87 is coupled back at terminal 300b to the base of transistor 76, to the collector of transistor 80 and to the collector of transistor 90b.

During the standby mode, control signal $V_{200a}$, that is at the low level as a result of signal 110 being at the high level, causes transistor 87 to be in saturation. Consequently, a collector current $i_{90b}$ of transistor 90b that flows into terminal 300b is shunted away from transistor 80 by transistor 87 that is conductive. Therefore, the collector current in each of transistors 76, 77 and 80 is forced to be zero. It follows that when on/off control signal 110 is at the high level, as a result of the user initiated power-off command, no base current flows in transistor 73 of arrangement 300. The emitter current in transistor 73 is, therefore, also zero. Thus, in the standby mode, the base current and, hence, the emitter current, in each of transistors 90a–90d, is also zero. The result is that control signal $S_c$ remains at an inactive state that prevents conduction of switch 102b so as to prevent the generation of voltage B+.

Bandgap voltage source 105 produces a second temperature compensated voltage $V_{BG1}$ that is coupled to the base electrode of a transistor Q2 having a grounded collector. The emitter of transistor Q2 is coupled to the collector of transistor 90d and to the base of an emitter follower transistor Q3. When transistor 90d conducts, that is caused by signal 110 being at the low level, the collector current of transistor 90d supplies a base current to transistor Q3 that produces, at the emitter of transistor Q3, a voltage $V_s$.

In accordance with an aspect of the invention, voltage $V_s$ that is controlled by arrangement 300 is temperature compensated and regulated by voltage $V_{BG1}$ during the power-up mode.

When the user initiates the power-up mode, transistor 108, that is coupled to remote receiver 107, becomes conductive. When transistor Q703 is nonconductive, due to signal 110 being at the low level, conductive zener diode 83 generates signal $V_{200a}$. Zener diode 83 is conductive as long as voltage $V_{cc}$ exceeds a first predetermined minimum, or threshold, first level that is sufficiently high to enable the start-up operation. Zener diode 83 prevents the initiation of the start-up operation if capacitor 66 is not fully charged above the first level. As a result of the conduction of zener diode 83, on/off control signal $V_{200a}$ at terminal 200a is pulled up to a sufficiently high level that causes transistors 85 and 84 to become turned-on.

During the start-up interval that occurs immediately after signal $V_{200a}$ causes transistors 84 and 85 to turn on, transistor 84 sinks current from the base of transistor 73, which begins to conduct simultaneously with transistor 84. The conduction of transistor 73 causes transistors 90a–90d to conduct the corresponding collector currents. Transistor 87, being turned off, allows transistor 90b to turn on the feedback network comprising transistors 76, 77 and 80. Conduction of transistor 90c turns on transistors 81 and 82 that cause a voltage $V_{BR1}$ at the emitter of transistor 84 to increase. The increase in voltage $V_{BR1}$ causes transistor 84 to become nonconductive. Transistor 73 base current is now supplied by conduction of transistors 76 and 77. In this way, control current arrangement 300 enables the emitter currents in each of transistors 90a–90d to flow; thereby, deflection IC 100 becomes operational. When the collector current in transistor 90d flows, voltage $V_s$ is generated.

In carrying out a feature of the invention, voltage $V_s$ is coupled via a terminal 777c to an IC 777 that includes, for example, horizontal oscillator 777a. Voltage $V_s$ is supplied from the emitter of transistor Q3 having an output impedance that is smaller than, for example, an input impedance formed at supply terminal 777c of IC 777. Therefore, advantageously, a variation of the input current at terminal 777c does not significantly affect the level of voltage $V_s$. Voltage $V_s$ is coupled to stages of IC 777 to provide the energizing voltage that is regulated and temperature compensated. When transistor 90d is conductive, a supply current $i_{777}$ is supplied from capacitor 66 to IC 777.

In carrying out an aspect of the invention, during operation in, for example, the standby mode, when transistor 90d is nonconductive, no base drive current is supplied to transistor Q3. Therefore, IC 777, advantageously, does not load capacitor 66 during the standby mode.

When voltage $V_s$ is generated, oscillator 777a generates a signal at, for example, a frequency of $32 \times f_H$ not shown in the FIGURES, that is divided down in a frequency divider 777b that is included internally in IC 777 so as to produce a signal $S_H$ at the frequency $f_H$. Signal $S_H$ is required by IC 100 for generating signals $H_r$ and $S_c$. Signal $H_r$ enables the switching operation of transistor Q1 that is required for generating voltage $V+$.

Voltage $V_s$ is coupled to the base of transistor Q4 via a diode D6 and a pull-up resistor 501 to provide the base drive to transistor Q4 during that portion of period H when transistor Q100 is nonconductive.

In carrying out yet another aspect of the invention, as long as voltage $V_s$ is zero that occurs, for example, during standby, the base drive to transistor Q4 is zero that causes its collector current to be zero. The collector of transistor Q4 is coupled to rectifier arrangement 106 during the standby mode. Consequently, loading of standby transformer T0 that is coupled via arrangement 106 to provide the collector current of transistor Q4 is, advantageously, prevented, during, for example, the standby mode.

Reducing the level of a current that is supplied from standby transformer T0 during the standby mode and the start-up interval is desirable in order to relax transformer T0 specifications so as to reduce the cost of transformer T0. Such cost is related to the current requirement from transformer T0.

During the start-up interval, as long as output stage 99 is inoperative, standby voltage $V_{SB}$ is coupled through a diode D9, resistor 502 and winding T2a to provide the supply voltage to the collector of transistor Q4.

FIGS. 2a–2d illustrate, schematically, waveforms useful for explaining the operation of deflection IC 100 of FIG. 1, during the start-up interval. Similar numbers and symbols in FIGS. 1 and 2a–2d depict similar items or functions.

During portion $t_0$–$t_1$ of the start-up interval of FIGS. 2a–2d, that immediately follows the user initiated power-up command, IC 100 of FIG. 1 is powered primarily from the charge already stored in capacitor 66. Because of the loading caused by, for example, the supply currents in deflection IC 100 and IC 777 and the base current in transistor Q4 that flows through diode D6, capacitor 66 may gradually discharge prior to voltage V+ attaining its normal operational level. The result is that voltage $V_{cc}$ of FIG. 2b may be reduced, at, for example, time $t_1$, to a level so low that voltage $V_{cc}$ becomes insufficient to sustain operation in the power-up mode.

The discharge of capacitor 66 of FIG. 1 may occur since, for example, IC 100 may draw more current, during the start-up interval, than can be provided by standby voltage $V_{SB}$ via resistor R1 that is relatively large. Resistor R1 is designed to be a large resistor, advantageously, for, reducing loading of transformer T0. Should capacitor 66 be discharged, as described before, zener diode 83 will turn off when capacitor 66 voltage falls below the breakdown zener voltage of diode 83. Transistor 85 remains, however, conductive, however, due to a supply of current through resistors 91 and 92. Deflection IC 100 will continue to operate to generate signals $H_r$ and $S_c$ and voltage $V_s$ until, for example, time $t_1$ of FIG. 2b when voltage $V_{cc}$ of FIG. 1 in capacitor 66 falls below a second predetermined level VL2 of FIG. 2b. The second predetermined level VL2 is a minimum lower holding level of, for example, 4 volts, which still is sufficient to supply enough current through resistors 91 and 92 of FIG. 1 to maintain conduction of transistor 85. Below the lower holding level VL2 that occurs at time $t_1$ of FIG. 2b, transistor 85 of FIG. 1 turns off. When transistor 85 turns off, however, transistors 87 and 90 will again saturate, turning off transistor 76, which will cause the emitter currents in transistors 90a–90d to become zero. With transistors 87 and 90 again saturated, voltage $V_{BR}$ causes voltage $V_s$ of FIG. 2c to become zero that causes the start-up operation to be aborted.

Figure 2:
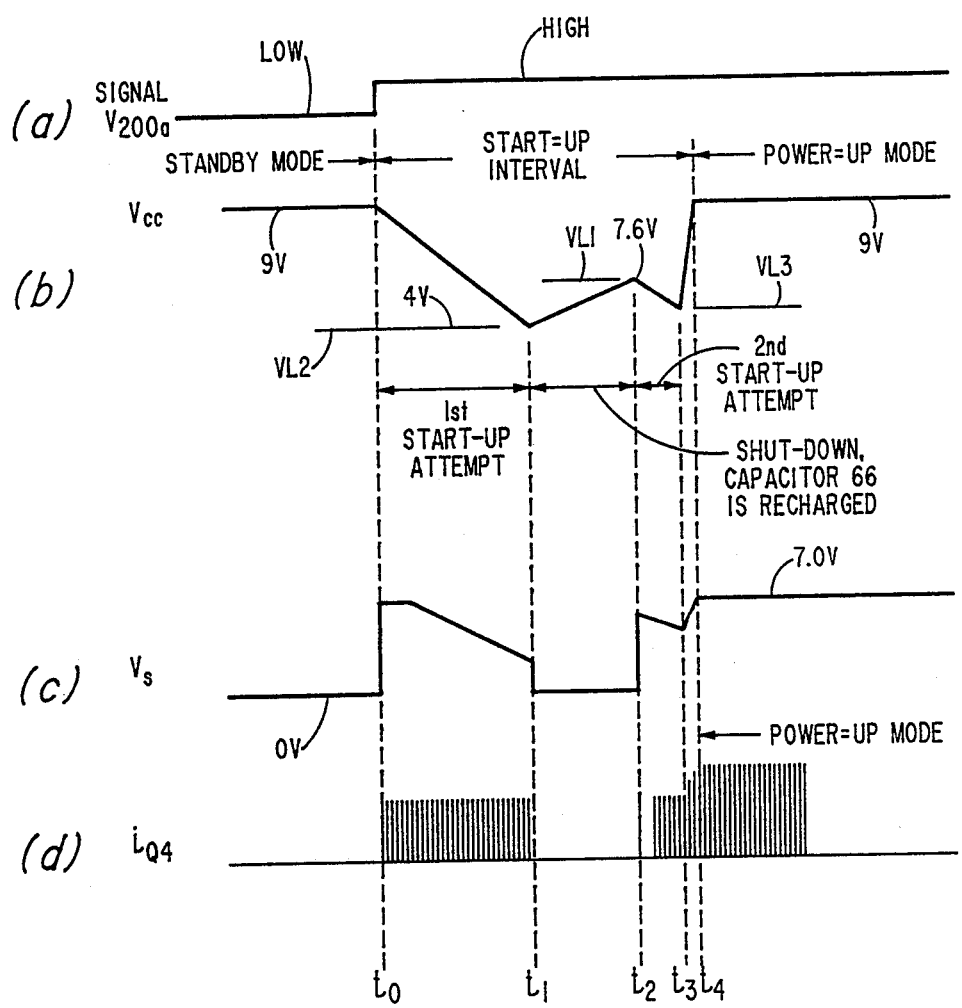

In accordance with a further aspect of the invention, voltage $V_s$ that is zero during, for example, shutdown interval $t_1$–$t_2$, causes a base current $i_{bQ4}$ of FIG. 1, advantageously, to be zero since transistor Q100 having an uncommitted collector is incapable of providing base current; hence, collector current $i_{Q4}$ of FIG. 2d in transistor Q4 of FIG. 1 and supply current $i_{777}$ that flows in IC 777 are, each, advantageously, zero. A pair of transistors Q99a and Q99b having base electrodes that are controlled by a signal of arrangement 200 that is developed at the collector of transistor 85, clamp voltage $V_s$ to zero voltage during the standby mode and during, for example, shutdown interval $t_1$–$t_2$ of FIG. 2b. During interval $t_1$–$t_2$ capacitor 66 of FIG. 1 is recharged. Thus, loading of capacitor 66 and loading of transformer T0 are, advantageously, reduced during interval $t_1$–$t_2$. Afterwards, the previously described process, forming a hysteresis-like arrangement that occurs due to the current in resistors 91 and 92, will be repeated. Capacitor 66 may, advantageously, be recharged as many times as are necessary until power-up mode operation is obtained in which rectifier arrangements 104 and 107 supply the corresponding run mode voltages. Thus, during such shut-down portions of the start-up interval, such as, for example, during interval $t_1$–$t_2$ of FIG. 2b, the corresponding supply current in each of deflection IC 100 of FIG. 1, IC 777 that includes oscillator 777a, and horizontal driver 666 is, advantageously, reduced.

Shut-down continues until capacitor 66 recharges to the first predetermined voltage level VL1 at time $t_2$ of FIG. 2b. During an interval $t_2$–$t_3$ that follows, a second start-up attempt occurs that is similar to that occurring during interval $t_0$–$t_1$. In the example shown, at time $t_3$ voltage V+ of FIG. 1 becomes sufficiently large so as to begin charging capacitor 66 via diode D2. During interval $t_3$–$t_4$ of FIG. 2b, capacitor 66 of FIG. 1 is charged up to a maximum level that is controlled by shunt regulator 131 that occurs at time $t_4$ of FIG. 2b. Henceforth, start-up operation ceases and normal operation power-up mode begins.

It should be understood that for a given amplitude of voltage $V_{AC}$ of FIG. 1 that is sufficiently high, a successful start-up attempt that is not aborted, may occur prior to, for example, time $t_1$ of FIG. 2b.

Collector current $i_{Q4}$ of FIG. 2d in transistor Q4 of FIG. 1 becomes increasingly larger during the corresponding portion of each of successively occurring periods H that occur during interval $t_3$–$t_4$ of FIG. 2d. During the power-up mode, the supply voltage that is coupled to resistor 502 of FIG. 1 via diode D8 is larger than the corresponding voltage that coupled via diode D9 during the standby mode and during the start-up interval. Therefore, during, for example, intervals $t_0$–$t_1$ and $t_2$–$t_3$, of FIG. 2d, collector current $i_{Q4}$ is, advantageously, smaller than during the power-up mode. Thereby, the current requirement from standby transformer T0 of FIG. 1 is reduced. As indicated before, horizontal rate collector current $i_{Q4}$ of FIG. 2d in transistor Q4 of FIG. 1 is, advantageously, zero in the standby mode and during, for example, shut-down interval $t_1$–$t_2$ of FIG. 2d.

What is claimed:

1. A television apparatus power supply comprising:
   a source of an input supply voltage;
   a transformer having a first winding that is coupled to said input supply voltage;
   means coupled to a second winding of said transformer for generating a first supply voltage at a first terminal during operation in a standby mode and during operation in a start-up interval;
   a source of an on/off control signal that is selectively indicative when operation in said standby mode is required and when operation in a power-up mode is required;
   a control circuit responsive to said on/off control signal for generating a signal at a first frequency, said control circuit being energized during said start-up interval from a voltage that is derived from said first supply voltage;

a first switching transistor responsive to said signal at said first frequency and to said on/off control signal and having a main current conducting electrode that is periodically switched at a rate that is determined by said first frequency signal during operation in each of said power-up mode and said start-up interval;

means responsive to said on/off control signal and coupled to said first supply voltage for generating at a second terminal a second supply voltage during said start-up interval but not in said standby mode;

a second switching transistor having a main current conducting electrode that is coupled to said first supply voltage during both said start-up interval and said standby mode and having a control electrode that is coupled to said second supply voltage, said control electrode of said second switching transistor being responsive to the switching of the main current conducting electrode of said first switching transistor for causing said second switching transistor to be conductive during said start-up interval; and an output stage of said power supply coupled to said main current conducting electrode of said second switching transistor for generating during said power-up mode a third supply voltage that is coupled to said main current conducting electrode of said second switching transistor.

2. An apparatus according to claim 1 further comprising, a capacitor that is coupled to said first terminal during said standby mode through a resistor to develop a fourth supply voltage in said capacitor that is coupled to said control circuit to energize said control circuit during said start-up interval, said control circuit forming a load that discharges said capacitor during a portion of said start-up interval, and means responsive to said fourth supply voltage for generating a second control signal during said start-up interval if said fourth voltage decreases below a predetermined level, said second control signal being coupled to said second supply voltage generating means for preventing, in accordance with said second control signal, said second supply voltage from being generated that enables said capacitor to recharge.

3. An apparatus according to claim 1 wherein said output stage comprises a deflection circuit output stage.

4. An apparatus according to claim 1 wherein said second winding of said transformer is conductively isolated by said transformer from said input supply voltage, and wherein said transformer conductively isolates said second switching transistor from said input supply voltage during said start-up interval.

5. An apparatus according to claim 1 further comprising a pull-up resistor that couples said second supply voltage to said main current conducting electrode of said first switching transistor such that during at least a portion of said start-up interval when said second supply voltage is generated a current that flows in a base electrode of said second switching transistor is supplied entirely from a current that flows in said pull-up resistor.

6. An apparatus according to claim 1 wherein said second switching transistor is nonconductive, during said standby mode, that reduces a current that flows in a current path that includes said second winding relative to that flowing therein during said start-up interval.

7. An apparatus according to claim 1 wherein a signal at a rate that is related to said first frequency and at a level that is determined by said second supply voltage is developed at said control electrode of said second switching transistor during said start-up interval, but not during said standby mode.

8. An apparatus according to claim 1 wherein said second winding of said transformer is conductively isolated by said transformer from said input supply voltage, and wherein said transformer conductively isolates said second switching transistor from said input supply voltage during said start-up interval.

9. In television apparatus having a power supply including a capacitance for energizing a first load circuit and a first current source for charging said capacitor prior to a start-up interval to a voltage at a level that exceeds a predetermined first voltage level, a start-up circuit, comprising:

a source of an on/off control signal that is selectively indicative when operation in a power-up mode and when in a standby mode is required;

means responsive to said voltage in said capacitor and to said on/off control signal for generating a second control signal that enables said power supply to energize said load circuit when said on/off control signal is at a first state that is indicative that operation in said power-up mode is required, provided said level of said voltage in said capacitance exceeds at least a predetermined second voltage level that is lower than said first voltage level, said second control signal disabling said power supply to prevent energizing of said load circuit when said on/off control signal is at a second state that is indicative that operation of said power supply in said standby mode is required, said power supply when enabled drawing a supply current from said capacitance that tends to discharge said capacitance and when disabled said power supply drawing a substantially smaller current from said capacitance;

means coupled to said capacitance and responsive to the attainment of said second voltage level in said capacitance for disabling said power supply so as to reduce said supply current drawn from said capacitor each time said capacitance discharges to said second voltage level for permitting said capacitance to recharge from said first current source;

means responsive to said second control signal for generating at a first terminal a first supply voltage when said power supply is enabled that is removed when said power supply is disabled;

an oscillator having a supply voltage receiving terminal that is coupled to said first supply voltage to form a second load circuit that draws from said first terminal at least a substantial portion of a supply current that is required for operating said oscillator such that when said power supply is disabled said supply current drawn by said oscillator from said first terminal is substantially reduced and when said power supply is enabled said oscillator produces a signal at a first frequency; and means responsive to said signal at said first frequency and to the energization of said first load circuit for generating a second current that is controlled by said first load circuit to develop a steady state voltage across said capacitance during said power-up mode that prevents said capacitance from discharging.

10. An apparatus according to claim 9 wherein said second current generating means comprises a horizontal deflection circuit output stage and wherein said oscillator comprises a deflection oscillator that generates said signal at said first frequency that is related to a horizontal frequency when said power supply is enabled.

11. An apparatus according to claim 9 wherein said second current generating means is coupled to said first terminal during operation in said power-up mode for supplying, during operation in said power-up mode, said supply current that is drawn from said first terminal and that is required for operating said oscillator.

12. An apparatus according to claim 11 further comprising, a bandgap type voltage regulator coupled to said capacitance for regulating a corresponding supply voltage that is applied to said first load and also for regulating said supply voltage at said first terminal that is applied to said second load, during said power-up mode.

13. An apparatus according to claim 9 further comprising, a temperature compensated voltage regulator coupled to said first supply voltage generating means for regulating said first supply voltage during said power-up mode.

14. An apparatus according to claim 13 wherein said first supply voltage generating means and said regulator are included in an integrated circuit that energizes, through said first terminal, said oscillator that is located outside said integrated circuit.

15. An apparatus according to claim 9 wherein said source of on/off control signal comprises a remote control receiver.

16. An apparatus according to claim 9 wherein said second current generating means comprises a switching transistor responsive to said signal at said first frequency and operating at a deflection frequency, said switching transistor having a main current conducting electrode that, during said power-up mode, is coupled to said second current generating means and during at least a portion of said start-up interval, said main current conducting electrode of said switching transistor is coupled to said first current source, instead, said switching transistor being coupled to a horizontal output stage to provide a horizontal rate drive current thereto.

17. An apparatus according to claim 9 wherein said first current source comprises a standby transformer having a first winding that is coupled to an input supply voltage, a rectifier that is coupled to a second winding of said transformer, and a resistor that is coupled between said rectifier and said capacitance, said capacitance being charged through said resistor, during said standby mode, such that said resistor isolates said capacitance from said standby transformer during at least a portion of said start-up interval.

18. An apparatus according to claim 9 further comprising a switching transistor operating at a frequency that is related to a deflection frequency having, during a given period thereof, a conductive state and a nonconductive state such that when said switching transistor is at said nonconductive state, said first supply voltage is coupled through a pull up resistor to a control terminal of said driver stage to turn on said driver and, when said transistor is at said conductive state, said first supply voltage is decoupled from said control terminal of said driver stage to turn off said driver stage and, during operation in said standby mode, the removal of said first supply voltage causes said driver stage to turn off.

19. An apparatus according to claim 18 wherein said first current source comprises a standby transformer coupled to an input supply voltage and a rectifier coupled to said transformer for producing a second supply voltage during said start-up interval, and wherein said driver stage comprises a second transistor having a main current conducting electrode that is coupled to said second supply voltage during said start-up interval and to said second current generating means, instead, during said power-up mode and having a control electrode that is coupled to said control terminal of said driver stage.

* * * * *